Sept. 1, 1925.  
E. F. GOBATTI  
1,552,140  
GRADOMETER  
Filed Sept. 12, 1923  
2 Sheets-Sheet 1
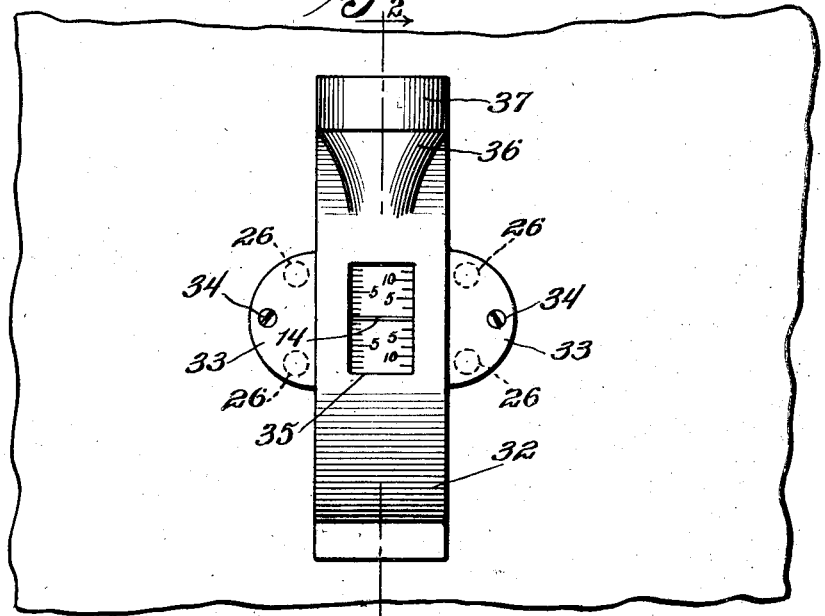
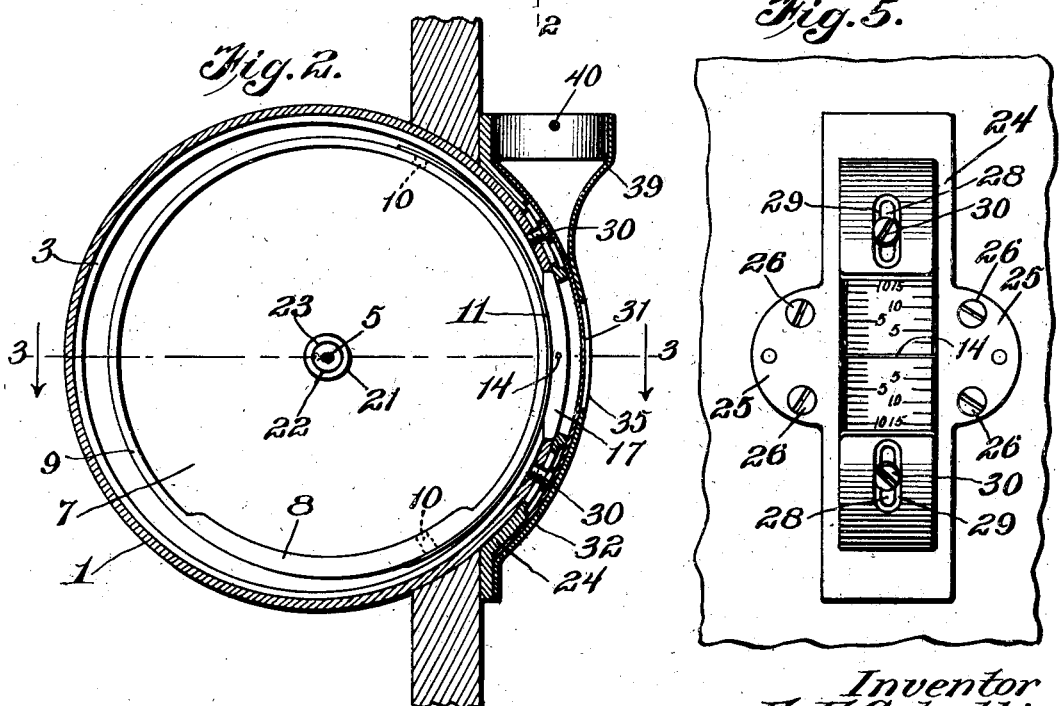
Inventor  
E. F. Gobatti  
Attys.

Sept. 1, 1925.
E. F. GOBATTI
1,552,140
GRADOMETER
Filed Sept. 12, 1923
2 Sheets-Sheet 2
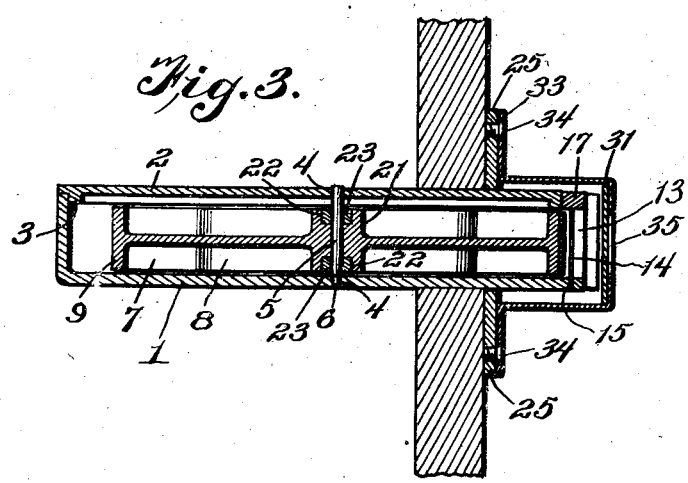
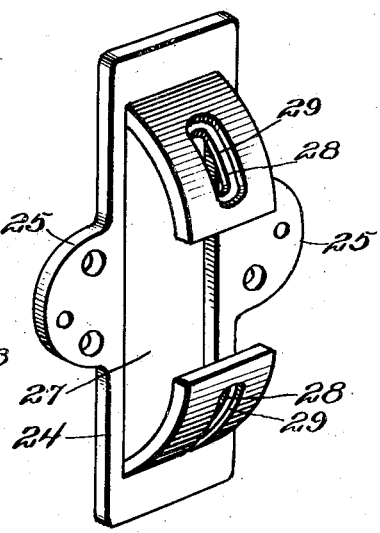
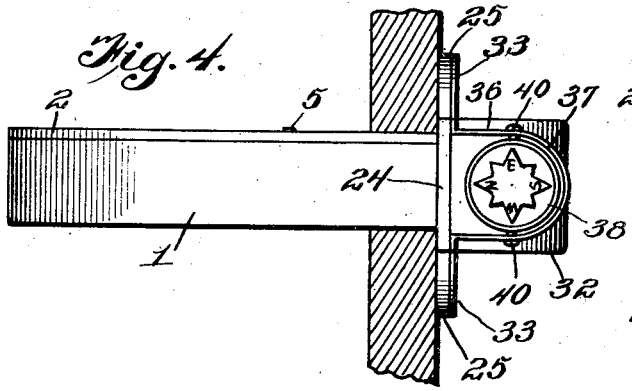
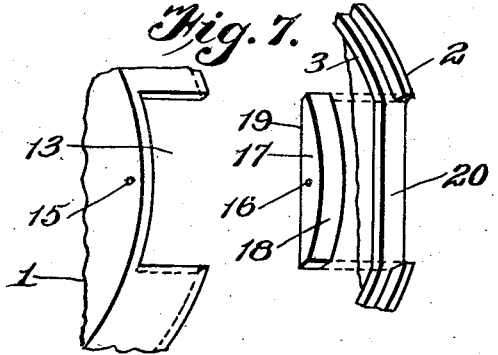
Inventor
E. F. Gobatti Patented Sept. 1, 1925.

1,552,140

UNITED STATES PATENT OFFICE.

EDMUND F. GOBATTI, OF PUEBLO, COLORADO.

GRADOMETER.

Application filed September 12, 1923. Serial No. 662,217.

*To all whom it may concern:*

Be it known that EDMUND F. GOBATTI, a citizen of the United States, residing at Pueblo, in the county of Pueblo and State of Colorado, has invented new and useful Improvements in Gradometers, of which the following is a specification.

The purpose of the present invention is to provide a device of this kind of improved construction for giving the readings of various grades or inclinations of roads, irrigation ditches and the like. Such device, when applied to a motor driven vehicle, will not only permit the chauffeur or driver to ascertain the various inclinations or grades on the road but will also indicate the direction of travel.

Another purpose is to provide, in a gradometer, a construction which is applicable to the instrument board, dash or other part of the vehicle, preferably the former, whereby the readings may be easily observed by the chauffeur or driver.

Still another purpose is to provide a construction including a casing with a gravity balanced member operatively mounted on the interior with readings that, when the vehicle is descending or ascending a grade, an indicator which is carried by the casing will move relatively to the readings and thereby indicate the inclination of the grade.

A further purpose is the provision of means in the construction of the gradometer for permitting the casing (which supports the gravity balanced member and carries the indicator) to be adjusted, whereby the indicator may register with the zero mark or graduation of the readings when the vehicle is at rest on a perfectly horizontal surface.

A still further purpose is the provision of means for mounting the casing on the instrument board or other part of the vehicle including a cover, the construction, arrangement and removability of which permits access to the means which adjustably supports the casing, so that the position of said casing may be regulated in case it becomes deranged due to the vibrations of the vehicle.

The invention, as a further purpose, aims to provide means for the support of a compass, whereby the chauffeur or driver may readily ascertain the direction of travel.

The invention comprises further features and combinations of parts to be hereinafter set forth, shown in the drawings and claimed.

In the drawings:

Figure 1 is a view in elevation of the improved gradometer constructed in accordance with the invention and as applied to the instrument board of a motor driven vehicle.

Figure 2 is a sectional view on line 2—2 of Figure 1, more clearly showing the mounting for the casing which operatively supports the gravity balanced member and also the compass.

Figure 3 is a transverse sectional view on the line 3—3 of Figure 2.

Figure 4 is a top plan view.

Figure 5 is an elevational view with the cover removed.

Figure 6 is a detail perspective view of the supporting plate.

Figure 7 is a collective perspective of that portion of the casing containing the sight opening and the sight cover, together with the plate which engages the sight cover, and closes the sight opening on one side.

Referring to the drawings, 1 designates a casing which may be of any suitable thickness and any diameter and which has a cover 2. This cover has a flange 3 which engages on the interior of the casing, thereby holding the cover concentric with the casing. The casing and the cover have bearings 4 for the reception of the ends of a shaft 5. One end of the shaft is reduced at 6 in order to engage through an opening in the casing. The other end of the shaft 5 engages an opening in one side of the cover.

A circular member 7, similar in construction to a pulley, is mounted upon the shaft 5. In fact, this member has an annular flange, a portion 8 of which is considerably thickened, constituting gravity means so that the member 7 will balance and remain practically in the same position at all times. It is true that the member may vibrate slightly but nevertheless the gravity means 8 will remain at the bottom. Secured at 10 to the outer face of the flange 9 of the member 7 is a plate 11. This plate conforms to the curvature of the circular member 7 and is provided with readings and graduations extending above and below a zero mark.

The casing has its cylindrical wall provided with an opening 13 through which these graduations may be easily observed, and disposed transversely in this opening is a steel wire 14 constituting an indicator. One end of the wire engages a hole or depression 15 in one edge of the opening 13 while the other end of the wire engages a hole or opening 16 in a plate 17. This plate has an outer curved edge 18 which conforms to the curvature of the edge of the cover 2 while the straight edge 19 of the plate engages the outer face of the flange 3. The portion 20 of the flange 3 with which the straight edge 19 engages is correspondingly straight so that the plate 17 will remain in a fixed position. By this arrangement of the plate, it is possible to remove the indicator at any time in case it becomes damaged without removing the cover from the casing.

The opposite ends of the hub 21 of the circular member 7 are provided with countersinks 22 for the reception of bearings 23 constructed of any suitable material, preferably of high tempered steel, although it is possible to construct these of glass or the like so that the member 7 will freely balance in the casing and permit the device to be sensitive to the slightest change in the grade of the road. In fact, the bearings permit the gravity member 7 to balance and maintain a constant position so that, when the vehicle is ascending or descending a grade, the slightest variation in the angle of the vehicle will be indicated on the graduations through the medium of the indicator moving relatively to the graduations upon the plate 11.

In order to mount the casing on the instrument board or other suitable location on the vehicle, a supporting plate 24 is provided. This plate has lateral ears 25 which receive screws 26 for securing the plate to the instrument board. The plate is dished longitudinally and the wall of the dished part is of arcuate form conforming to the curvature of the casing. The arcuate wall of the plate 24 is split, at 27, to provide an opening through which the readings upon the plate 11 may appear. The arcuate wall of the plate 24 above and below the opening 27 is provided with elongated slots 28 which are rabbeted, as shown at 29, for the reception of flat headed bolts or screws 30 which engage with the wall of the casing. In fact, the screws or bolts are threaded through the cylindrical wall of the casing and, prior to tightening, the casing may be adjusted angularly with reference to the holding plate for the proper positioning of the former.

A transparent protecting strip 31 (which is preferably celluloid) engages over the plate 24 to protect the indicator and also the graduations on the plate 11 as well as precluding foreign matter from the casing. A cover conforming to the shape of the plate 24 engages over the plate and retains the celluloid protecting strip in place. This cover has lateral ears 33 for the reception of screws 34 which also pass through the ears 25 and into the instrument board to hold the parts firmly and securely connected thereto. The cover 32 is also of arcuate form to conform to the arcuate shape of the plate 24 which, in turn, conforms to the contour of the casing.

The cover 32 has an opening 35 and its upper portion merges into a hollow enlargement 36 which has a cylindrical part 37. This cylindrical part is adapted for the reception of the casing of a compass 38 which is of the usual construction. The lower marginal corner of the casing of the compass engages with a shoulder 39 where the lower wall of the enlargement merges into the cylindrical wall. Suitable set-screws 40 arranged at diametrically opposite points of the cylindrical wall 37 are provided for holding the compass in position.

It will be noted that the casing is in a fixed position relatively to the instrument board and since the gravity balanced member 7 is mounted to maintain its proper balance in the casing, the indicator will move relatively to the graduations on the plate 11 when the vehicle ascends or descends a grade. By observing the compass, the chauffeur or driver of the vehicle may readily ascertain the direction of travel and by watching the position of the indicator with relation to the graduations upon the plate 11, the degree of inclination of the grade may be readily ascertained.

The invention having been set forth, what is claimed is:

1. A gradometer comprising a casing, a cylindrical gravity-controlled member pivotally mounted therein and having graduations on its periphery, an arcuate-shaped holding plate adapted to be secured to a support, means for fastening the casing on the holding plate, said casing and the holding plate having aligned openings through which the graduations are visible, a transparent cover shielding said aligned openings to protect the graduations, and a metal cover conforming to the shape of the holding plate and engaging thereover to be secured to the support.

2. A gradometer comprising a casing, a cylindrical gravity-controlled member pivotally mounted therein and having graduations on its periphery, an arcuate-shaped holding plate adapted to be secured to a support, said casing and the holding plate having aligned openings through which the graduations are visible, means for securing the casing to the holding plate and adjusting it angularly on the latter for proper positioning of the casing when mounted, an indicator transversely spanning the opening in the casing for registration with the graduations, and a metal cover conforming to the shape of the holding plate and engaging thereover for securement to the support, said cover being provided with a transparent portion disposed over said aligned openings.

3. A gradometer comprising a casing, a cylindrical gravity-controlled member pivotally mounted therein and having graduations on its periphery, an arcuate-shaped holding plate adapted to be secured to a support, means for fastening the casing on the holding plate, said casing and the holding plate having aligned openings through which the graduations are visible, a transparent cover shielding said aligned openings to protect the graduations, and a metal cover conforming to the shape of the holding plate and engaging thereover for securement to the support, said holding plate and cover each having a pair of oppositely disposed co-extensive ears for the reception of fastening screws to engage the support and holding plate respectively.

In testimony whereof he affixes his signature.

EDMUND F. GOBATTI.